United States Patent [19]

Fain

[11] Patent Number: 4,649,649
[45] Date of Patent: Mar. 17, 1987

[54] TAPE MEASURE

[76] Inventor: Earl Fain, 13424 Hwy. 507 SE., Rainier, Wash. 98576

[21] Appl. No.: 794,679

[22] Filed: Nov. 4, 1985

[51] Int. Cl.4 .................................................. G01B 3/10
[52] U.S. Cl. ...................................... 33/138; 242/84.8
[58] Field of Search ............. 33/138, 139, 140, 141 E; 242/84.8

[56] References Cited

U.S. PATENT DOCUMENTS

| 692,665 | 2/1902 | Hills et al. | 242/84.8 |
| 2,014,375 | 9/1935 | Carlson | 33/138 |
| 3,473,751 | 10/1969 | Quenot | 242/84.8 |
| 4,142,693 | 3/1979 | Czerwinski | 33/138 |
| 4,565,005 | 1/1986 | Naka | 33/138 |
| 4,566,198 | 1/1986 | Vitale | 33/138 |

FOREIGN PATENT DOCUMENTS 332431 10/1903 France .................................... 33/138

Primary Examiner—Richard R. Stearns
Attorney, Agent, or Firm—Quaintance, Murphy & Presta

[57] ABSTRACT

An otherwise conventional handheld, coilable tape measure having an exposed, rotatable wheel forcible into friction engagement with the coiled tape so that the tape may be uncoiled and extended by holding the tape measure with only one hand, forcing the wheel against a fixed, flat surface, and pushing the tape measure away from one's person. The wheel is loosely mounted so as to stay in contact with the coiled tape as it is extended and its wound diameter decreases, either by a fixed stub pin axle and slot arrangement or by a fixed arbor and large, open wheel center.

2 Claims, 10 Drawing Figures

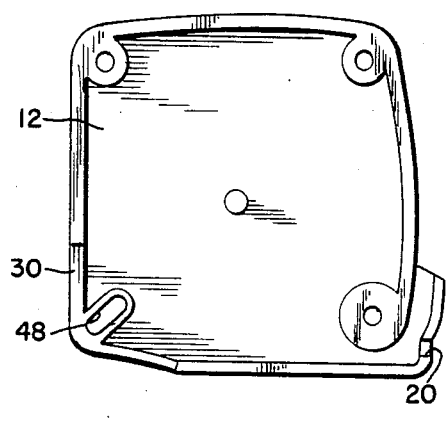
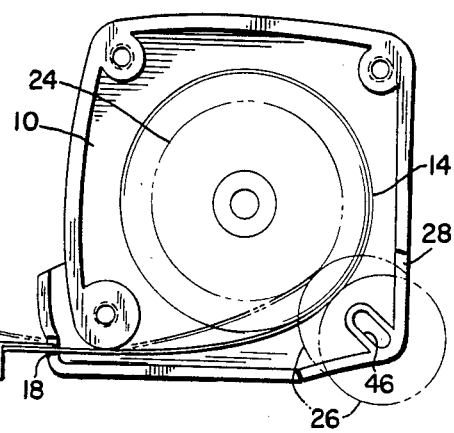
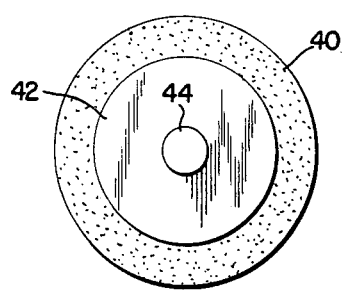
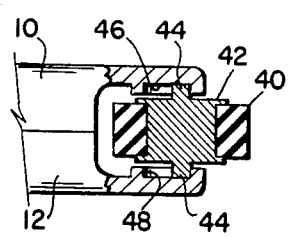
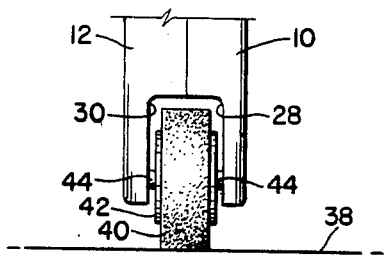

TAPE MEASURE

BACKGROUND OF THE INVENTION

This invention relates to handheld tape measures including a housing and a tape measure coiled within the housing, the improvement invention herein being a loosely mounted wheel assembly which permits one-handed operation of the tape measure to extend the coiled tape measure from its housing.

Conventional, commercially available handheld tape measures ordinarily include a housing within which a tape measure is coiled, the coiling including an interior recoil spring assembly for automatic rewinding of the tape measure into the housing by activating a recoil lever. A major drawback in this very useful tool is that it requires both hands of the user to initially extend the tape. One hand grasps the tape housing and the other hand pulls the tape outwardly from an open mouth in the housing. If the user is employing one hand for holding a tool or positioning an object, then he cannot pull out the measuring tape from the housing with his second hand without laying down the tool or releasing the object. Thus, it is necessary for the user to interrupt his work and use both hands to pull out the measuring tape from the housing. These multiple steps of laying down of a tool or object, using both hands to pull out the measuring tape, and then returning to the work with the tool or object are both a waste of time and motion.

All known, commercially available measuring tapes of the type described require the use of both hands in order to extend the measuring tape from the housing. Patented prior art teachings are equally devoid of useful suggestion and providing a measuring tape of the type described which may be used with only one hand. Somewhat relevant prior art disclosures are found in the following U.S. patents: U.S. Pat. No. 2,268,178 issued Dec. 30, 1941 to W. W. Boisture; U.S. Pat. No. 3,364,580 issued Jan. 23, 1968 to R. E. Lucia; U.S. Pat. No. 4,155,168 issued May 22, 1979 to R. Clark DuBois; U.S. Pat. No. 4,200,983 issued May 6, 1980 to Robert West et al; and U.S. Pat. No. 4,189,107 issued Feb. 19, 1980 to Michael Quenot et al.

In contradistinction to the prior art, the present invention provides a tape measure operable by only one hand whereby the tape measure housing may be held and moved against a stable surface to run out or extend the measuring tape.

SUMMARY OF THE INVENTION

It is a principal object of the invention to provide an improved measuring tape so constructed that the user may employ only one hand to extend the tape measure from its housing.

It is another object of the invention to provide a tape measure improvement wherein only a minor modification is necessary to add a movable wheel for contacting the measuring tape coiled within a housing to extend the measuring tape out of the housing.

It is another object of the invention to provide an improved tape measure operable by only one hand having a minimum number of moving parts which are uncomplicated in construction and substantially maintenance free.

Generally speaking, the invention includes an otherwise conventional measuring tape having an opening formed in a portion of the measuring tape housing within which a wheel is loosely mounted, the wheel being arranged to contact a portion of the tape coiled within the housing and to extend from the housing. The invention is then operable by one hand whereby the housing is grasped to press the wheel against a stable surface and the coiled tape whereafter the housing is pushed away from the user and the tape is extended from the housing. The tape measure conventional spring-loaded recoil mechanism retains the measuring tape at the extended position. After a measurement is taken, the conventional lever of the recoil mechanism may be depressed to recoil or rewind the measuring tape into the housing.

BRIEF DESCRIPTION OF THE DRAWINGS

Further and more complete objects and advantages of the invention will become readily apparent by reference to the following specification and drawings in which;

FIGS. 6-10 are views similar to FIGS. 1-5 and illustrating another embodiment of the invention.

DESCRIPTION OF THE PREFERRED EMBODIMENTS

Figure 2:
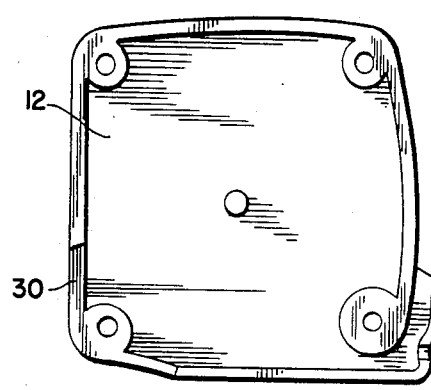
FIG. 2 is an elevation view of the cover of a housing which fits over the half of the measuring tape illustrated in FIG. 1.
Figure 1:
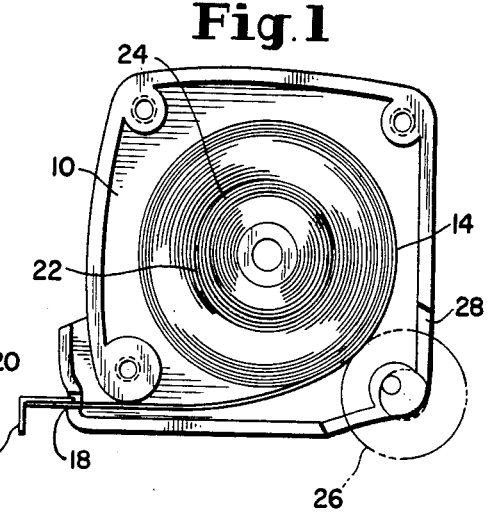
FIG. 1 is an interior, elevation view of one half of an otherwise conventional tape measure modified in accordance with the teachings of this invention.
Figure 3:
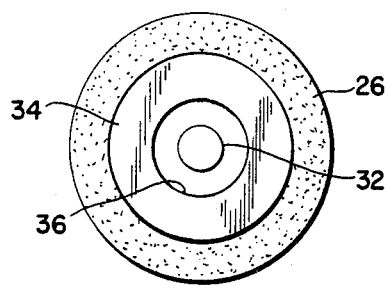
FIG. 3 is a side elevation view of one embodiment of a wheel used for extending the measuring tape, drawn to an enlarged scale.

Referring now to the drawings by reference character and in particular to FIGS. 1 and 2 thereof, conventional components of a commercially available tape measure include a generally four-sided housing divided centrally into a base 10 (FIG. 1) and a mating cover 12 (FIG. 2). In assembly, base 10 and cover 12 are attached together by screws (not shown) at the four corners thereof. A tape measure 14 is coiled within the base 10 and cover 12 and includes a free end with a conventional hook or stop 16. The free end of tape measure 14 extends through an open mouth formed by openings 18, 20 formed in base 10 and cover 12 respectively. With further reference to FIG. 1, an end of the coil measuring tape 14 opposite hook 16 is attached at 22 to a conventional, wound recoil spring 24. Ordinarily, the tape measure as described includes a recoil spring actuating assembly (not shown) including an actuating lever (not shown) mounted on the exterior of the housing formed by the base 10 and cover 12, above hook 16.

Figure 4:
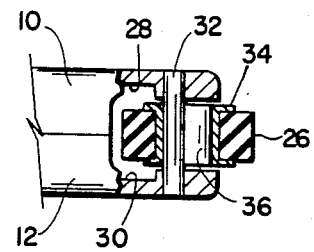
FIG. 4 is a fragmentary end view, partially in section; showing the wheel of FIG. 3 mounted within an opening formed in the housing of the otherwise conventional tape measure.

The improvement of this invention includes a wheel 26 loosely mounted within an opening formed in base 10 and cover 12, the wheel engaging both a portion of the tape measure wound within the housing and a stable surface so that the housing may be grasped by one hand and pushed away from the user to extend the tape from the housing. Accordingly, mating openings 28 and 30 are formed in base 10 and cover 12, respectively. An axle pin 32 is mounted in the opening formed at 28, 30 as is best shown in FIG. 4. Loosely mounted thereon is wheel 26 with a hub 34 having a greatly enlarged, internal diameter with respect to the external diameter of axle or arbor pin 32, thus to form a bearing seat 36 which is most clearly seen in FIG. 4.

Figure 5:
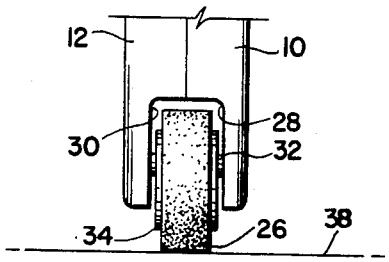
FIG. 5 is a fragmentary end view, illustrating the wheel placed against a stable surface.

Operation of the invention is uncomplicated. The user simply grasps the housing formed by base 10 and cover 12 and places wheel 26 against a stable surface 38 as is illustrated in FIG. 5. Relating orientation of the invention in FIG. 5 with FIG. 1, clearly hook 16 of tape measure 14 will be faced away from the user. The housing formed by base 10 and cover 12 is depressed against surface 38 and pushed away from the user. This will cause tape measure 14 to be extended since, in the sense of FIG. 1, wheel 26 is moving in a counterclockwise direction thus to rotate the coil formed by measuring tape 14 within the housing in a clockwise direction. Now, as extension of tape measure 14 continues, the diameter of the interior, coil portion of tape measure 14 will decrease. As this diameter decreases, wheel 26 remains in frictional engagement with a portion of coiled tape measure 14 within the housing due to the large diameter of hub 34 defined by bearing seat 36, which permits wheel 26 to move toward the center axis of the coil portion of tape measure 14.

After a measurement is taken, the tape 14 may be recoiled within its housing by actuation of the conventional recoil mechanism of the tape measure (not shown) by reversing the one-handed extended motion just described so as to rotate wheel 26, in the sense of FIG. 1, in a clockwise direction. This will cause the coiled portion of tape measure 14 within the housing to rotate in a counterclockwise direction, in the sense of FIG. 1, thus moving hook 16 towards the mouth formed by openings 18, 20.

When the conventional, recoil spring mechanism of the tape measure is used to recoil tape measure 14, wheel 26 will fall away from contact with tape measure 14 with the housing lifted off the surface 38 due to the large, interior diameter of hub 34. Thus, wheel 26 does not interfere with this operation.

Referring now to FIGS. 6–10, the second embodiment of the invention will be discussed. Conventional components of the tape measure are the same as before and are numbered the same. Similarly, the opening formed by openings 28 in base 10 and 30 in cover 13 are the same.

The difference in this embodiment is that the loose mounting of the wheel differs. In this embodiment, wheel 40 includes a central, solid hub 42 having a pair of stub axle pins fixed to and extended from hub 42, on either side thereof. Loose mounting of wheel 40 is provided by slots 46, 48 formed in base 10 and cover 12, respectively, as is shown in FIGS. 6 and 7, respectively. As the invention is operated as before, with wheel 40 against a stable surface 38 (FIG. 10), axle pins 44 ride loosely within slots 46, 48, thus to accommodate the decreasing diameter of tape measure 14 as it is unwound from its housing.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What I claim is:

1. A tape measure comprising: a generally rectangular housing dimensioned to be held in one hand of a user; a coiled tape measure mounted centrally within the housing; means defining a mouth through a first lower corner of the housing through which a free end of the tape measure extends; means defining an opening in a second corner of the housing adjacent said one lower corner; a wheel mounted in said opening such that a portion of the wheel extends outwardly of the housing and another portion of the wheel may frictionally engage a portion of the tape measure coiled within the housing; an arbor pin rigidly mounted within said opening in said second corner of the housing; means defining a bearing seat opening centrally within said wheel, said bearing seat having a diameter substantially greater than that of said arbor pin; whereby said tape measure may be extended from said housing by grasping said housing with one hand, forcing said wheel downwardly against a stable surface and pushing said housing away from a user's person, the wheel rotating and moving towards the central axis of rotation of the coiled tape measure to maintain the wheel in engagement with a portion of the coiled tape measure as it decreases in diameter as the tape measure is extended.

2. A tape measure comprising: a generally rectangular housing dimensioned to be held in one hand of a user; a coiled tape measure mounted centrally within the housing; means defining a mouth through a first lower corner of the housing through which a free end of the tape measure extends; means defining an opening in a second corner of the housing adjacent said one lower corner; a wheel mounted in said opening such that a portion of the wheel extends outwardly of the housing and another portion of the wheel may frictionally engage a portion of the tape measure coiled within the housing; said wheel including a central hub and stub axle pin means fixed and extended from each side of said hub, centrally thereof; and means defining a pair of elongate slots within said second corner of the housing for loosely mounting said wheel and which loosely receive said stub axle pin means, said stub axle pin means contacting and being freely rotatable within said elongage slots whereby said tape measure may be extended from said housing by grasping said housing with one hand, forcing said wheel downwardly against a stable surface and pushing said housing away from a user's person, the wheel stub axle pin means riding in said slot to maintain the wheel in engagement with a portion of the coiled tape measure as it decreases in diameter as the tape measure is extended.

* * * * *